UNITED STATES PATENT OFFICE.

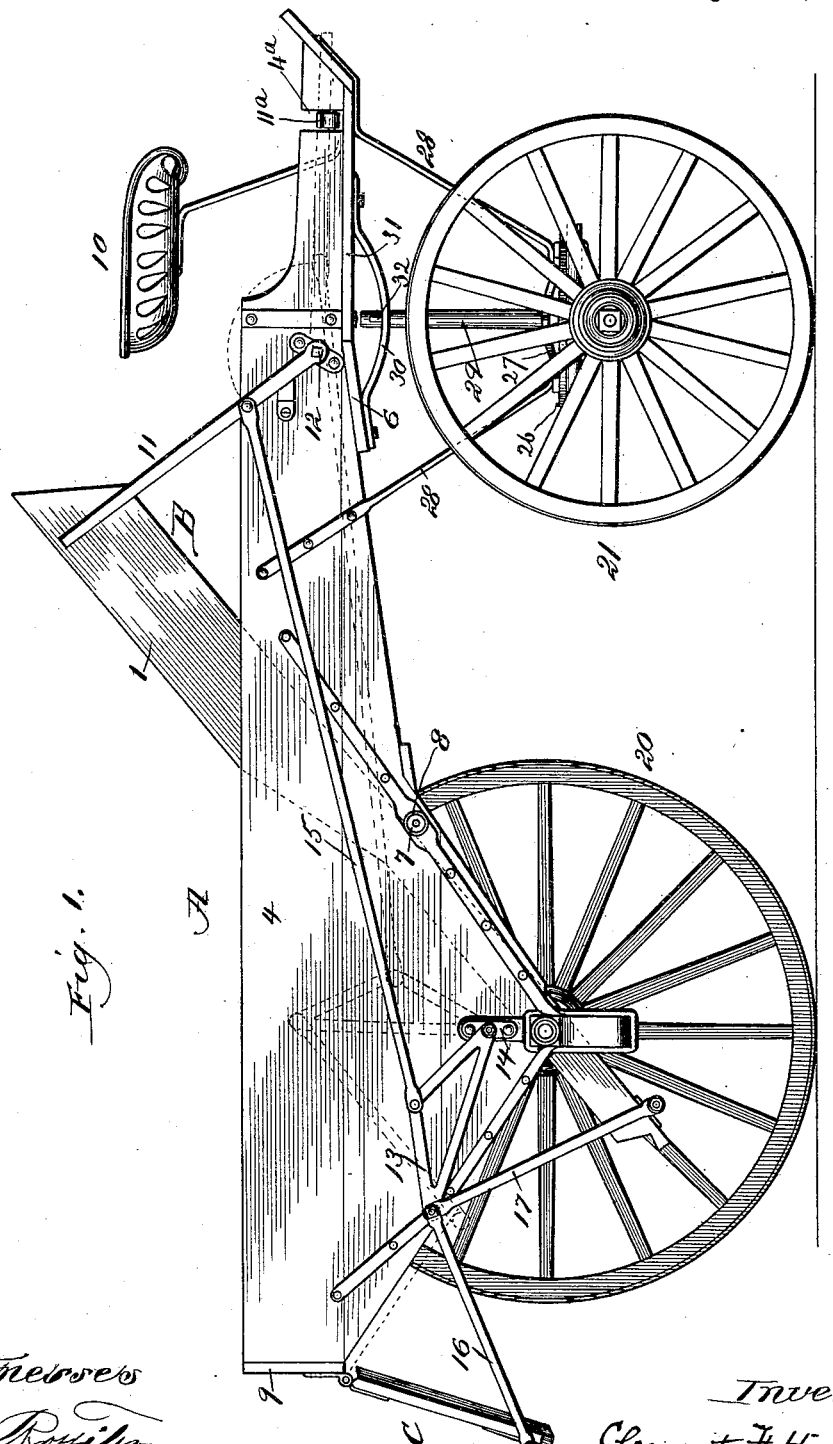

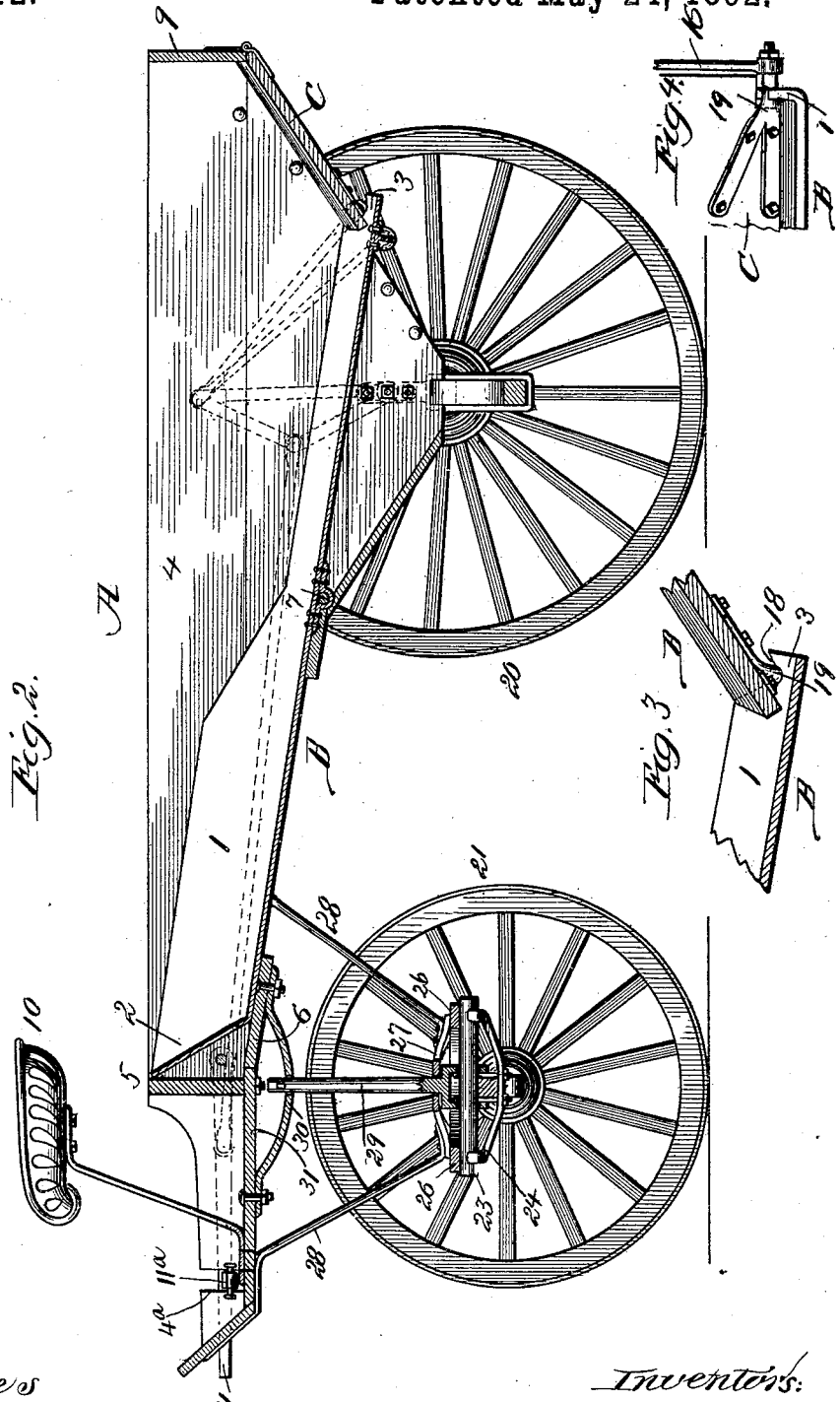

CLEMENT F. HINMAN AND MORTON G. BUNNELL, OF CHICAGO, ILLINOIS, ASSIGNORS TO FREDERICK C. AUSTIN, OF SAME PLACE.

DUMPING-WAGON.

SPECIFICATION forming part of Letters Patent No. 475,312, dated May 24, 1892.

Application filed February 24, 1891. Serial No. 382,356. (No model.)

*To all whom it may concern:*

Be it known that we, CLEMENT F. HINMAN and MORTON G. BUNNELL, both citizens of the United States, residing at Chicago, in the county of Cook and State of Illinois, have invented a certain new and useful Improvement in Dumping-Wagons, of which the following is a specification.

The more prominent objects of our invention are to provide a highly-efficient four-wheeled dumping-wagon capable of carrying a large load and adapted for quickly and readily dumping the same; to permit a clean dump and avoid the retention of sod and the like in or on any part of the wagon; to permit the driver to easily restore the wagon to its normal condition after the load has been discharged; to adapt the wagon for running over uneven ground, and to provide certain novel and improved details serving to increase the efficiency and serviceability of dumping-wagons.

To the attainment of the foregoing and other useful ends our invention consists in matters hereinafter set forth.

In the accompanying drawings, Figure 1 represents in side elevation a four-wheeled dumping-wagon embodying our invention, with its bottom in position for discharging the load and its end-gate open. Fig. 2 is a longitudinal vertical section taken centrally through the wagon, the bottom and end-gate being closed. Figs. 3 and 4 are details showing the rear end of the tilting bottom.

The four-wheeled wagon-body or body-frame A increases in depth from front to rear, and is provided with a tilting bottom B. The tilting bottom normally occupies an inclined position, as in Fig. 2, and resembles a shallow pan formed with longitudinally-arranged sides 1 and a sloping front 2, but open at its rear end 3, so that when it is tilted for dumping purposes the load will be readily discharged. The body A is constructed with sides 4 and a front 5, which is rigid with said sides, the construction and arrangement of the dumping pan or bottom B being such that when it is in its closed or normal position the upper edge of its inclined front end 2 rests against the body-front 5 at the upper edge of the same, while its sides 2 fit against the inner faces of the sides 4 of the body-frame. The body is also provided at its forward end with a bottom cross-piece 6, on which the forward end of the tilting bottom rests when the latter is in its normal position. The tilting bottom 1 extends substantially the length of the wagon-body and is pivotally supported at a point between its ends by a pivot 7, which is secured to the tilting bottom and journaled in bearings 8 on the sides 4 of the body. By thus pivotally supporting the tilting bottom it can be closed, as in Fig. 2, and also tilted for the purpose of dumping the load, as in Fig. 1. By increasing the depth of the wagon-body from front to rear, as aforesaid, the larger part of the load will rest upon the portion of the tilting bottom which is in rear of the pivot 7, and hence as soon as the tilting bottom is free to tilt it will at once be tilted by the greater weight of the rear portion of the load. The wagon-body is at its rear end closed in part by an upper end piece 9, which is rigid with the sides 4, and in part by a swinging end-gate C, which is hinged to the end piece 9 and arranged so that when closed its lower edge shall lie close to the rear end 3 of the tilting bottom B, as in Figs. 1 and 3.

At the forward end of the wagon and within convenient reach of a driver occupying the seat 10 is a hand-lever 11, which is fulcrumed by a pivot 12 upon one side of the wagon-body and manipulated as a means for actuating the mechanism by which the tilting bottom and swinging end-gate can be operated. The mechanism for thus operating the tilting bottom and end-gate is constructed as follows: A vibratory lever 13, formed by a triangular frame, is at one corner fulcrumed upon a bearing 14 on one of the sides 4 of the wagon-body. A connecting-rod 15 serves to connect another corner of said triangular-shaped lever with the hand-lever 11, while the third corner of said triangular-shaped lever is connected with the end-gate and tilting bottom by links 16 and 17, the former being arranged as a connection between the lever and end-gate and the latter as a connection between the lever and rear end of the tilting bottom. When the tilting bottom and end-gate are closed, the lever 13 and links 16 and 17 will occupy the positions indicated in dotted lines in Figs. 1 and 2, and at such time the hand-lever will have been swung forward and down, as in dotted lines, Fig. 1, and in dotted and full lines, Fig. 2, in which position said lever will, with regard to its fulcrum and the rod 15, be on or below the dead-center, so as to lock the dumping mechanism. In order to dump the load, the driver will swing the hand-lever upwardly, and as soon as the dead-center has been passed the weight of the load on the rear portion of the tilting bottom will cause an automatic tilt of said bottom and an automatic opening of the end-gate, which latter will swing back in time to allow the load to be dumped with an exceedingly rapid and clear discharge. Where the hand-lever 11, which is connected with the tilting bottom or receptacle, is swung forward and below the dead-center, it will be locked, and hence in order to unlock it the driver must raise it above the dead-center, as aforesaid. To permit the driver to conveniently unlock said lever, we provide a pivotally-supported movable stop or rest 11$^a$, which works in a slot 4$^a$ in one of the sides of the fixed body-frame and which can be operated by the driver's foot. When the lever is swung forward and down, as indicated in dotted lines in Fig. 1, it will rest upon said movable stop or stirrup, which for the purpose of raising the lever can be operated by the foot of the driver. As a matter of course the form of the lever 13 can be varied, since practically it is a bell-crank, it being understood that the triangular form is herein adopted as a simple, convenient, and economical shape. The end-gate may, when closed, engage with the tilting bottom by any suitable form of catch which can be readily disengaged, a preferred way being to notch the sides of the tilting bottom, as at 18, Fig. 3, and adapt the pivot-bearing 19 for the link 16 to seat in said notch when the gate and bottom are closed.

The wagon-body is four wheeled, being supported by rear wheels 20 and front wheels 21, which latter stand lower than the forward end of the body, so as to permit quick turning. The front axle 22 supports a bearing 23, formed by a round rod or bar, which is arranged parallel with the length of the wagon and which crosses the middle of the axle. The bearing 23 is held and steadied by a two-armed bracket 24, which is held against the under side of the axle by clips 25 and adapted at its ends to embrace the bearing 23. The fifth-wheel or circle 26 rests and turns upon the bearing 23 and is rigid with a spider 27, which is in turn made rigid with the wagon-body by brace-rods 28. The king-bolt 29 is supported upon the bearing 23 so that it may vibrate toward the sides of the wagon and extends through an opening in the plate or spider 27, so as to form a pivot for the circle, and also engages in a bearing 30, which is secured to the under side of forwardly-arranged bottom portions 31 and 6 of the body-frame. The king-bolt is also provided with a shoulder or pin 32 just above said bearing, so as to guard against the accidental disconnection of the king-bolt from the bearing. By the foregoing arrangement the front axle can tilt independently of the body-frame when one of its wheels is suddenly raised by running over an elevation or depression in the road, and also the wagon-body can rock independently of the front axle when one of the rear wheels encounters such elevation or depression.

The foregoing-described connection between the front axle and body-frame constitutes the subject-matter of another application filed by us, and hence no claim is herein made to the same. Description and illustration, however, of such matters are herein desirable, since the same show a practical way of supporting the inclined portion of the body-frame in position corresponding with the normal inclination of the pan, which forms a tilting receptacle extending substantially over the space between the front and rear axles and pivoted at such height that while it can receive and carry the entire load it can also dump the same over the rear axle.

With further reference to the dumping qualities of the wagon it may be observed that while the tilting dumping pan or bottom B is pivoted nearly midway of its length it is preferably pivoted back of its longitudinal middle, so that its forward portion shall be somewhat heavier than its rear portion. The weight of its forward portion is further augmented by the forward portions of its sides 2, which are somewhat higher in front of than in rear of the pivot 7. By such arrangement the driver will have no difficulty in closing up the pan or bottom and the end-gate after the load has been dumped.

By providing a four-wheeled wagon with the long pan or bottom B and increasing the depth of the body, as hereinbefore set forth, a large load can be carried and, when desired, be dumped with ease. The construction of the pan or bottom B also permits it to be made of metal, and hence when it is tilted the load will readily slide down the same.

It is understood that a duplicate of the dumping mechanism comprising the lever 13, links 16 and 17, and connecting-rod 15 can be and in practice is arranged at the opposite side of the wagon; but that in place of another hand-lever the connecting-rod can connect with a crank, and that the pivot 12 can be extended through the wagon-body and carry such crank.

What we claim as our invention is—

1. A four-wheeled dumping-wagon having a body provided with an inclined tilting bottom pivotally supported between its ends, substantially as set forth.

2. A four-wheeled dumping-wagon having a body provided with an inclined tilting bottom pivotally supported between its ends, and a swinging end-gate, substantially as set forth.

3. A four-wheeled dumping-wagon having a body provided with an inclined tilting bottom pivotally supported between its ends, a swinging end-gate, and mechanism for simultaneously operating the tilting bottom and end-gate.

4. The combination, in a dumping-wagon, of a four-wheeled body adapted to increase in depth from front to rear and provided with a normally-inclined tilting bottom pivotally supported between its ends and end-gate, substantially as set forth.

5. The combination, in a dumping-wagon, of a four-wheeled body A, provided with a normally-inclined tilting bottom pivotally supported between its ends, a swinging end-gate C, a vibratory lever connected with both the end-gate and the tilting bottom, and a hand-lever connected with the vibratory lever, substantially as set forth.

6. The combination, in a dumping-wagon, of the four-wheeled body A, provided with a tilting bottom, an end-gate C, a hand-lever 11, and a vibratory lever 13, fulcrumed upon the wagon-body, a rod 15, connecting the hand-lever with the vibratory lever, and links 16 and 17, connecting the end-gate and tilting bottom with the vibratory lever, substantially as set forth.

7. A dumping-wagon comprising, in combination, a four-wheeled body-frame provided with longitudinally-arranged sides with rise proportionally to the carrying capacity of the wagon, an end-gate, and a tilting pan pivotally supported at a point between the front and rear wheels and forming a bottom which when closed lies between said sides of the body-frame and which extends substantially over the space between the front and rear axles, said pan being pivotally supported at a point between its ends and arranged so that it can tilt independently of the said body-frame and discharge over the rear axle, substantially as set forth.

8. The combination, in a dumping-wagon, of a tilting receptacle pivotally supported upon the body-frame of the wagon, a hand-lever connected with the tilting receptacle for operating the same and locked when swung down by passing below the dead-center, and a movable stop within control of the driver and arranged for raising the lever above the dead-center, so as to unlock the same, substantially as set forth.

9. The combination of the wagon-body supported by rear and front wheels and having its sides formed with substantially horizontal top edges and inclined lower edges which incline upwardly from rear to front, the front wheels being adapted to run under the body in turning, and a tilting bottom B, pivoted midway of its ends and arranged to operate between said sides of the body, substantially as set forth.

CLEMENT F. HINMAN.
MORTON G. BUNNELL.

Witnesses:
JOSEPH F. KELLEY,
CHAS. G. PAGE.